United States Patent
Korecki

(10) Patent No.: US 7,193,188 B2
(45) Date of Patent: Mar. 20, 2007

(54) TEMPERATURE CONTROL SYSTEM FOR CONTROLLING HEAT TREATMENT OF METALS, THAT IS HEATING, SOAKING AND COOLING BY A SINGLE FREQUENCY CONVERTER

(75) Inventor: Maciej Korecki, Swiebodzin (PL)

(73) Assignee: Seco/Warwick SP.ZO.O, Swiebodzin (PL)

( * ) Notice: Subject to any disclaimer, the term of this patent is extended or adjusted under 35 U.S.C. 154(b) by 0 days.

(21) Appl. No.: 10/521,578

(22) PCT Filed: Jul. 2, 2003

(86) PCT No.: PCT/PL03/00064

§ 371 (c)(1),
(2), (4) Date: Oct. 17, 2005

(87) PCT Pub. No.: WO2004/006036

PCT Pub. Date: Jan. 15, 2004

(65) Prior Publication Data

US 2006/0086716 A1 Apr. 27, 2006

(30) Foreign Application Priority Data

Jul. 5, 2002 (PL) .................................... 354910

(51) Int. Cl.
*H05B 1/02* (2006.01)
(52) U.S. Cl. .................. 219/497; 219/491; 219/494; 219/508
(58) Field of Classification Search ............... 219/490, 219/491, 494, 497, 501, 507, 508, 483–486, 219/481; 307/39–41
See application file for complete search history.

(56) References Cited

U.S. PATENT DOCUMENTS

| 6,441,353 | B1 | 8/2002 | Brossmer et al. |
| 6,956,189 | B1 * | 10/2005 | Verhagen .................... 219/632 |
| 7,019,270 | B2 * | 3/2006 | Verhagen .................... 219/667 |

FOREIGN PATENT DOCUMENTS

| EP | 1 182 413 A | 2/2002 |
| EP | 1 681 526 A2 | 7/2006 |
| JP | 07 272847 A | 10/1995 |

OTHER PUBLICATIONS

Roth et al.; "Solid-State High Frequency Power Converters;" Power and Energy—2003 from proceeding (379-183); 5 pages.

* cited by examiner

*Primary Examiner*—Mark Paschall
(74) *Attorney, Agent, or Firm*—Oliff & Berridge, PLC

(57) ABSTRACT

The purpose of the present invention is to create a temperature control system applied in heating and cooling phases of thermal processing. The invented temperature control system consists of a single frequency converter F to whose output, through contactors, are simultaneously connected: at least one heating system and at least one cooling system. The heating system incorporating resistance heating elements R is actuated by the heating system contactor SG. The cooling system incorporating gas blower, 3-phases induction motor MD is actuated by the blower motor contactor SD. The heating and cooling system contactors (SG and SD) are connected to the output of the frequency converter F and are controlled by the temperature controller RT.

5 Claims, 1 Drawing Sheet

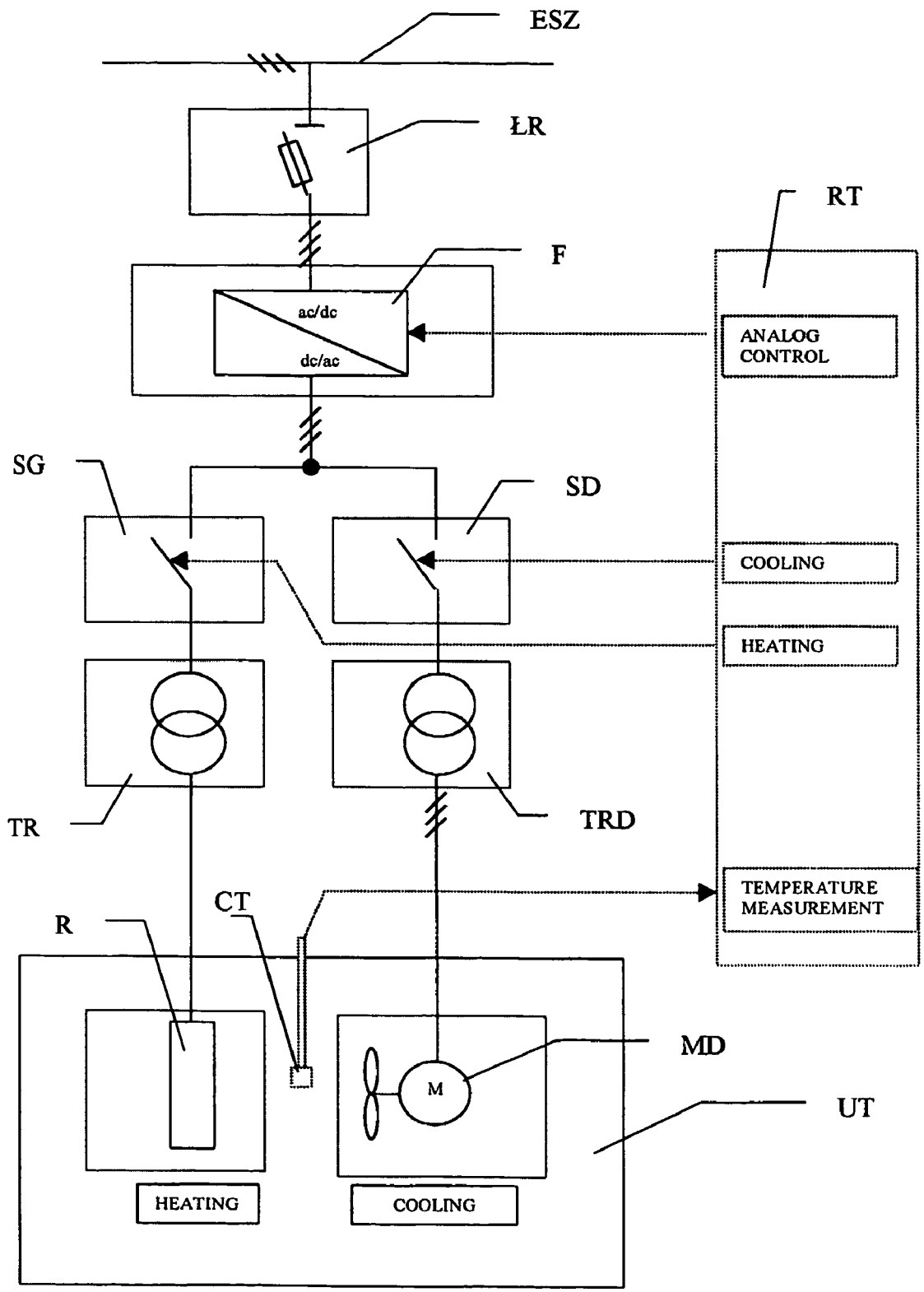

TEMPERATURE CONTROL SYSTEM FOR CONTROLLING HEAT TREATMENT OF METALS, THAT IS HEATING, SOAKING AND COOLING BY A SINGLE FREQUENCY CONVERTER

BACKGROUND

The scope of the present invention is a temperature control system applied in heating and cooling phases of thermal processing.

In the known thermal devices a system of infinitely variable adjustment of the power of resistance heating elements is based on a three-phase silicon controlled rectifier (SCR) or a variable reactance transformer (VRT). An SCR connected to the electrical supply, controls the power following a control input from a programmable temperature controller, through alteration of the effective output voltage as a result of switching on and off full cycles of sinusoidal supply voltage (proportional-time control or group control, where mean output voltage U is proportional to supply voltage $U_n$ and switch-on time $T_z$ and inversely proportional to period T; $U=U_n \times T_z/T$), or through partial clipping of the sinusoidal supply voltage (phase control).

A variable reactance transformer (VRT) adjusts the power following a control input from the control system, through alteration of the effective output current resulting from the impact upon the VRT control circuit current.

In standard thermal equipment the cooling process is not controlled and the operation of the cooling gas blower motor (3-phases, induction motor) forcing gas circulation through the workload is not adjustable. The motor works to standard working parameters dependent on the load and is connected directly to electrical supply. In the case of motors whose power exceeds a few dozen kW, soft-start systems are used in order to reduce the starting current (and only that). Some designs provide for a two-speed motor featuring a 2:1 ratio of rated rotations of high and low speeds and, consequently, a 4:1 ratio of rated power, which enables motor operation at two rotational speeds and powers as well as diversification of cooling rate: slow cooling at low speed and rapid cooling at high speed.

The latest designs call for full control of the workload cooling process (workload temperature) following an input signal from the temperature controller through adjustment of the cooling blower motor rotational speed within 0–100% (or even more) of rated speed. This is made possible by inverters known as frequency converter which adjust the rotational speed of a 3-phases induction motor by modulating the effective voltage and its frequency or phase. Performance characteristic of a blower motor prevents independent control of rotational speed, power and torque of the motor since a change to any of these parameters entails automatic change of the remaining ones and, effectively, control of rotational speed of an induction motor results in a change of its power or torque. In such a case the motor is wired to the frequency converter's output through a contactor. The frequency converter is supplied from a three-phase supply mains and transforms this energy into three-phase supply of the motor of proper voltage-frequency characteristic, thus enforcing the requested rotational speed and output power or torque.

SUMMARY

The purpose of the present invention is to create a single system of alternate control of heating and cooling processes which would be controlled by a single frequency converter.

The invented temperature control system consists of a frequency converter to whose output, through contactors, are simultaneously connected: the heating system and the cooling system. The heating system incorporating resistance heating elements is actuated by the heating system contactor. The system may contain a transformer which can adjust voltage if required by the heating elements. The transformer is wired between the heating system contactor and the resistance heating elements.

The cooling system blower is actuated by the blower motor contactor which may also incorporate a transformer to adjust the voltage as needed by the blower motor. The heating and cooling system contactors are connected to the output of the frequency converter and are controlled by the temperature controller.

An advantage in this application would be to have the rated current of the heating and cooling systems comparable at the ratio of 0.33–3 in both systems. Similarly, the rated supply voltage for the heating and cooling systems should be comparable at the 0.33–3 ratio of the rated supply voltage for both systems.

Application of a single frequency converter allows alternate control of the heating system and the cooling system while temperature control is on. Effectively, the heating and cooling process control is streamlined and the number of components indispensable to provide such a system is reduced. The system significantly improves the application and exploitation properties of a thermal device.

BRIEF DESCRIPTION OF THE DRAWINGS

A exemplary system for the present invention has been shown in the attached drawing. Dwg 1.

DETAILED DESCRIPTION OF EMBODIMENTS

In this example the thermal device UT is a gas cooling vacuum furnace fitted with resistance heating elements R rated at 300 kW and a cooling blower powered by 250 kW motor MD.

The heating system with the transformer TR and heating elements R is supplied with rated voltage of 3×400 V, 50 Hz and rated current of 456 A.

The cooling system with the transformer TRD and blower motor MD is supplied with rated voltage of 3×400 V, 50 Hz and rated current 464 A.

Both systems are wired through contactors SG and SD to the frequency converter F of rated output voltage 3×400 V and current 480 A and analog control signal 4–20mA corresponding to the set frequency of 0–50 Hz.

The contactors SG and SD are controlled by the temperature controller RT.

The entire temperature control system is powered by electrical supply ESZ 3×400 V, 50 Hz with the disconnecting device LR and contactors selected for max 630 A current.

In this configuration temperature control follows a time-temperature sequence. The thermal process was programmed according the following time-temperature sequence:

Heating from ambient temperature to 800° C. at the rate of 15° C./min
Soaking at 800° C. for 2 hrs
Heating to 1050° C. at the rate of 10° C./min
Soaking at 1050° C. for 1 hr
Cooling down to 300° C. at the rate of 10° C./min
Cooling down to 70° C. at the rate of 3° C./min.

Upon starting the thermal process the heating control system is turned on. The temperature controller RT switches on the heating contactor SG and sends off a control signal to the frequency converter. The control signal is the result of the calculation of PID algorithm based on the value and error of control, i.e. the difference between temperature readout from temperature sensor CT and the programmed actual set value.

In the event the temperature from the CT sensor shows insufficient increase dynamics in comparison to the actual set value, the value of the control signal which powers the heating elements R through the transformer TR rises, which results in an increase of the frequency converter F output frequency and voltage. Consequently, a voltage rise on the heating elements causes an increase of their output power, which in turn boosts the temperature dynamics.

Should the temperature from the CT sensor indicate excessive increase dynamics in comparison to the actual set value, the value of the control signal lowers, which results in a decrease of the frequency converter F output frequency and voltage. Consequently, a voltage drop on the heating elements causes lowering of their output power, which in turns brings about a decrease of dynamics or even a reduction of temperature.

Following the above principles, the temperature controller RT controls furnace heating up to 1050° C. in accordance with a programmed process sequence.

After soaking at 1050° C. for one hour, the control system switches over from heating to cooling. The temperature controller RT resets the control signal, turns the heating system contactor SG off and turns the blower motor contactor SD on. Then it sends to the frequency converter a control signal resulting from PID algorithm calculation based on the extent and change of control error, i.e. inversely than before: the difference between the programmed actual set value and temperature readout from CT sensor.

In the event the temperature from the CT sensor shows insufficient drop dynamics in comparison to the actual set value, the value of the control signal rises, which results in an increase of the frequency converter F output frequency and voltage. Consequently, a frequency and voltage rise on the blower motor MD causes an increase of its rotational speed, which in turn boosts the dynamics of temperature drop.

Should the temperature from the CT sensor indicate excessive drop dynamics in comparison to the actual set value, the value of the control signal lowers, which results in a decrease of the frequency converter F output frequency and voltage. Consequently, a frequency and voltage drop on the blower motor MD supplied via transformer TRD, causes lowering of its rotational speed, which in turns brings about lowering of the blower's cooling capacity and causes a slower dynamics of temperature drop.

Following the above principles, the temperature controller RT controls furnace cooling down to 70° C. at which point the temperature control system turns off and the thermal process is completed.

The invention claimed is:

1. A temperature control system in a thermal device, comprising:
    an electrical supply network,
    a frequency converter connected to the electrical supply network by a disconnecting device,
    a temperature sensor,
    resistance heating elements connected to an output of the frequency converter by a first contactor,
    a motor-driven cooling gas blower connected to the output of the frequency converter by a second contactor,
    a temperature controller on which a thermal process for the thermal device is programmed and which controls the frequency converter,
    wherein the frequency converter modulates effective voltage supplied to the resistance heating elements and supplied to the motor-driven cooling gas blower,
    wherein the output of the frequency converter is simultaneously connected through the first contactor to at least one heating system that includes the resistance heating elements, and through the second contactor to at least one cooling system that includes the blower and a blower 3-phases induction motor, and
    wherein the first and second contactors are controlled by the temperature controller.

2. The temperature control system according to claim 1, further comprising a transformer between the first contactor of the heating system and the resistance heating elements.

3. The temperature control system according to claim 1, further comprising a transformer between the second contactor of the blower and the blower motor.

4. The temperature control system as according to claim 1, wherein a rated current of the heating and cooling systems maintains a ratio of 0.33–3.

5. The temperature control system according to claim 1, wherein a rated voltage of the heating and cooling systems maintains a ratio of 0.33–3.

* * * * *